United States Patent [19]
Bengel

[11] Patent Number: 5,465,279
[45] Date of Patent: Nov. 7, 1995

[54] REACTOR COOLANT PUMP SEAL TEST DECONTAMINATION HOUSING

[75] Inventor: Thomas G. Bengel, Pittsburgh, Pa.

[73] Assignee: Westinghouse Electric Corporation, Pittsburgh, Pa.

[21] Appl. No.: 303,901

[22] Filed: Sep. 9, 1994

[51] Int. Cl.⁶ ................................................... G21C 17/00
[52] U.S. Cl. .......................... 376/245; 376/203; 376/310; 376/463; 73/865.6
[58] Field of Search ..................................... 376/203, 245, 376/305, 310, 313, 340, 341, 463; 73/865.6

[56] References Cited

U.S. PATENT DOCUMENTS

| | | | |
|---|---|---|---|
| 4,876,058 | 10/1989 | Fero et al. | 376/245 |
| 5,089,216 | 2/1992 | Schlonski et al. | 376/310 |
| 5,126,100 | 6/1992 | Bengel et al. | 376/245 |
| 5,377,244 | 12/1994 | Stenger | 376/310 |

*Primary Examiner*—Daniel D. Wasil

[57] ABSTRACT

An arrangement of reactor coolant pump seals arranged in a generally annular stack with a plurality of stacking spacers in a test housing for emplacement in a chemical decontamination test loop enables a variety of flow characteristics to be simulated by varying the detailed arrangement of the RCP seals and supporting structure in the test housing. By adjusting parameters such as fluid chemistry, gross flow, pressure, and temperature in a controlled manner with systems incorporated into the test loop, additional information can be obtained regarding the feasibility of any specific decontamination process. The magnitude of process fluid flow across particular surfaces of one or more RCP seal components can be predetermined by selecting the placement, number and dimensions of penetrations in a flow distribution tube through which the process fluid enters the housing. The penetrations feed the process fluid to channels in selected stacking spacers, thereby directing the process fluid flow to selected seal surfaces. The arrangement of the stacked seal assembly also assures that each of the seal components will experience a process fluid flow similar to what would be experienced in an in situ decontamination procedure in an RCP.

24 Claims, 4 Drawing Sheets

REACTOR COOLANT PUMP SEAL TEST DECONTAMINATION HOUSING

BACKGROUND OF THE INVENTION

1. Field of the Invention

The invention relates to systems for qualification of chemical decontamination procedures for nuclear reactor coolant systems, and, in particular, to an arrangement for test decontamination of reactor coolant pump seals for use in a test decontamination loop.

2. Background of the Invention

Nuclear reactor systems, such as those used for electric power generation, are typically cooled by water flowing through channels in the reactor core. Pressurized water reactor (PWR) systems include a closed loop primary coolant system circulating coolant water between the reactor core and the heat exchangers used for steam generation. During operation of the nuclear power plant, surfaces of components in the core and in the primary coolant system can corrode. The corrosion products, generally referred to in the industry as crud, can be activated by transport of the corrosion products to the core region by the reactor coolant system (RCS). The activated crud can be subsequently released from the core region and redeposited elsewhere in the system, thereby producing radiation fields throughout the piping and components of the primary system. The activated crud distributed in the primary system creates a radiation hazard for workers during routine maintenance and refueling outages.

It is therefore desirable to be able to periodically decontaminate the primary system using chemical treatment of the primary coolant water to remove crud from the primary system without having to dismantle its component parts. Any such chemical decontamination procedure first must be qualified and tested to assure that the procedure does not cause significant degradation of core and primary system components that may adversely impact the function, design capability, or life of the RCS.

U.S. Pat. No. 5,126,100, entitled "System for Qualification of Chemical Decontamination Methods for Decontamination of Nuclear Reactor Systems", incorporated herein by reference, discloses a method and apparatus for assessing the feasibility of employing particular chemical decontamination processes to remove crud from primary systems in nuclear reactors without adversely affecting the integrity of the components and piping during further reactor operation. A simulator apparatus allows coupons of material within a test housing to be subjected to a variety of temperatures and pressures in order to simulate a decontamination process within an actual RCS. The exposed materials can then be evaluated to assess the impact and acceptability of the decontamination processes and/or the materials used.

However, U.S. Pat. No. 5,126,100 does not disclose an apparatus or method for controlling flow characteristics over surfaces of primary system components, such as RCP seals, to reproduce flow fields that would be experienced by the components used in an RCS. Total flow through the test housing can be varied, but not the direction and magnitude of the flow across any particular surface.

In order to more accurately assess the feasibility of any decontamination procedure in the test loop, it is desirable to arrange the component parts being test decontaminated in a manner that accurately reproduces typical operating conditions in a primary system, and in particular, flow characteristics. Therefore, there is a need for an apparatus for arranging primary system component parts, such as reactor coolant pump (RCP) seals, that will permit selection of direction and magnitude of process fluid flow across selected surfaces of the component parts within a test housing. This will, in turn, permit close simulation of the flow characteristics in an operating primary system during an actual chemical decontamination procedure.

SUMMARY OF THE INVENTION

This need and others are satisfied with an arrangement of RCP seals in a chemical decontamination test loop that can permit selection of a variety of flow characteristics, such as magnitude and direction of process fluid flow, across a surface of a selected RCP seal. The invention also provides an arrangement of a set of RCP seals within a test housing wherein at least one surface of each of the seals in the test housing can be subjected to a flow of process fluid.

RCP seals, each of which typically has a generally annular-shaped cross section, are arranged in a vertical stack within an integral seal test housing and coaxially centered on the longitudinal axis thereof. The test housing can be included in a chemical decontamination test loop. Operational conditions associated with the chemical decontamination of RCP seals contaminated with crud can be simulated by flowing process fluids in the test loop through the test housing, thereby circulating process reagents over and through RCP seals vertically stacked within the housing, to remove and/or dissolve the corrosion products containing radionucleides that cause the high radiation levels on the RCP seal surfaces.

The test housing includes a fluid inlet in a base at a first end and a fluid outlet near a second end opposite the first end for flowing a process fluid therethrough. A seal assembly is located within the test housing between the first and second ends thereof, and includes a plurality of generally annular-shaped RCP seals, preferably a set of seals from one pump, and a plurality of stacking spacers, each also generally annular-shaped, that are juxtaposed between some of the adjacently located seals to form a generally annular stack within the housing. The RCP seals from a single pump have a variety of different shapes, therefore the stacking spacers typically are also each shaped differently to accommodate the shapes of the adjacently stacked components of the seal assembly. A positioning system locates and stabilizes the stack within the test housing. The positioning system can include a plurality of axially spaced, annular-shaped support rings positioned radially outside the stack of RCP seals and stacking spacers, connected together by a plurality of longitudinally extending rods that are each affixed at one end to the base of the test housing.

The interior surface of the housing, which is preferably cylindrical, and the outer peripheral surface of the seal assembly define a substantially annular-shaped first space therebetween for the flow of process fluids. Process fluids can also flow in a substantially cylindrical-shaped second space defined by the axial core of the seal assembly. A flow distribution system for selectively distributing the process fluid across a surface of a selected one of the pump seals includes a fluid distribution tube, about radially centered in the stack, characterized by a first end connecting with the fluid inlet and at least one penetration for outflow of the process fluid into at least one of the first space and the second space. The bottommost stacking spacers are centered by the flow distribution tube in a preferred arrangement. The upper ends of the first space and the second space are in fluid communication with each other at the top end of the housing.

According to another feature of the invention, the flow distribution system is further characterized by a system of channels for flowing the process fluid across a surface of the selected one of the pump seals. The system of channels includes a plurality of about radially extending channels defined by grooves in a surface of a first one of the stacking spacers, and a facing surface of an adjacently located, second stacking spacer. An annular channel is defined by an annular-shaped groove in the surface of the first one of the stacking spacers, the facing surface of the second stacking spacer, and the peripheral surface of the distribution tube. A plurality of circumferentially spaced penetrations at a selected longitudinal position in the distribution tube are about longitudinally aligned with the annular-shaped channel and the plurality of radially extending channels for directing the flow of process fluid into the channels. The process fluid flow entering the distribution tube from the fluid inlet is directed about radially outward through the plurality of circumferentially spaced penetrations into the annular-shaped channel, and therefrom into the plurality of radially extending channels and thence across the surface of the selected one of the RCP seal that is about longitudinally aligned with the surface of the first stacking spacer. The surface of the selected one of the seals is preferably spaced apart from a facing surface of either a different one of the seals or another of the stacking spacers. The fluid flows therefrom into the first space and along the outer periphery of the seal assembly toward the outlet of the test housing.

According to another aspect of the invention, the distribution tube includes a penetration, or vent hole, at its second end communicating with the second space.

According to another aspect of the invention, the flow distribution system is characterized in that the dimensions of the vent hole and the circumferentially spaced penetrations in the flow distribution tube are selected such that a greater proportion of the process fluid flows through the first space than through the second space.

According to another aspect of the invention, a second system of channels provides a directed flow of the process fluid across a surface of a second one of the pump seals. The second system of channels include a second plurality of radially extending channels defined by a second plurality of radial grooves in a surface of a third one of the stacking spacers and a second facing surface of an adjacently located fourth stacking spacer. The second system of channels can also include, like the first system of channels, a second annular-shaped channel defined by an annular-shaped groove in the surface of the third stacking spacer, the second facing surface and the peripheral surface of the distribution tube. A second plurality of circumferentially spaced penetrations at a second selected longitudinal position in the distribution tube, that are about aligned with the second annular-shaped channel, directs process fluid flow outward thereto. Some of the process fluid flow entering the distribution tube is directed by the second plurality at circumferentially spaced penetrations into the second annular-shaped channel, then through the plurality of radially-extending channels and therefrom across the surface of the second one of the seals, which is about aligned with the second longitudinal position. The surface of the second one of the seals is preferably spaced apart from a second facing surface at another seal or stacking spacer. After flowing across the surface of the second one of the seals, the process fluid enters the second space and flows therefrom to the fluid outlet.

The invention also encompasses a method of test decontaminating a plurality of reactor coolant pump seals with a reactor coolant pump test and decontamination loop that includes a fluid flow loop and a mechanism for flowing a process fluid therethrough, such as a pump. The method includes the step of enclosing an annular-shaped stack that includes up of the plurality of reactor coolant pump seals and a plurality of stacking spacers in a test housing having a fluid inlet and a fluid outlet; then connecting the inlet and the outlet of the test housing to the fluid flow loop such that the process fluid can flow through the test housing; then flowing the process fluid through the fluid flow loop, including the test housing; and selectively directing a flow of the process fluid in the test housing across a surface of a selected one of the pump seals.

According additional features of the invention, the step of selectively directing a flow includes the steps of first directing the flow from the inlet into a fluid distribution tube connected at one end to the inlet and extending longitudinally in the test housing, the stack being centered on the distribution tube; second, directing the flow therefrom through at least one penetration in the distribution tube at a selected longitudinal position; third, directing the flow therefrom through a plurality of radially extending channels in the stack at the selected longitudinal position; fourth, directing the flow therefrom across the surface of the selected one of the pump seals; fifth, directing the flow therefrom into the first space; and sixth, directing the flow therefrom out the outlet. The step of selectively directing a flow can include, after the step of directing the flow through at least one penetration, the step of directing the flow through an annular-shaped channel at about the selected longitudinal position in fluid connection between the at least one penetration and the plurality of radially extending channels.

According to other aspects of the invention, the fluid flow velocity across the surface of the selected one of the seal surfaces is controlled by varying the fluid distribution tube penetration size and number, the gross fluid flow rate through the test housing, and the spacing between the surface of the selected one of the pump seals and a facing surface of an adjacent stacking spacer or an adjacent one of the pump seals.

It is an object of the invention to provide an arrangement of RCP seals for use in a chemical decontamination test loop wherein fluid flow characteristics across selected seal surfaces, such as flow magnitude and flow direction, can be selected.

It is another object of the invention to provide an apparatus for positioning a set of RCP seals in a test housing for use in a chemical decontamination test loop wherein at least one surface of each of the seals in the test housing can be subjected to a flow of process fluid.

These and other objects of the invention will be more fully understood from the following description of the invention with reference to exemplary embodiments as illustrated in the drawings appended hereto.

DETAILED DESCRIPTION OF THE PREFERRED EMBODIMENT

Surfaces of RCP seals and associated assemblies can become activated by contaminants, such as crud, carried through the reactor coolant system. In order to qualify procedures for removing the crud and surface activation, and thereby reducing overall activation of the RCP's, decontamination procedures can be tested in a chemical decontamination test loop, such as that disclosed in co-owned U.S. Pat. No. 5,126,100, entitled "System for Qualification of Chemical Decontamination Methods for Decontamination of Nuclear Reactor Systems" Parts, such as RCP seals, to be test decontaminated are put into a test housing connected to the test loop. The system therein disclosed permits adjustment of parameters such as fluid chemistry, pressure, and temperature. The magnitude of the process fluid flow through the entire test housing can be controlled in a gross manner. However, RCP seal components are irregularly shaped, having, generally annular-shaped cross sections. It is difficult to know, during a test decontamination procedure, the magnitude of the process fluid flow or the direction of flow across any particular surface. The system disclosed by U.S. Pat. No. 5,126,100 does not disclose how to arrange RCP seals in a test housing such that the flow characteristics across particular seal surfaces can be predetermined or even known.

The present invention provides an arrangement of RCP seals in a test housing that is adapted for emplacement in a chemical decontamination test loop. A variety of flow characteristics can be simulated by varying the detailed arrangement of the RCP seals and supporting structure in the test housing. By adjusting parameters such as fluid chemistry, the magnitude of flow through the test housing, pressure, and temperature in a controlled manner with systems incorporated into the test loop, additional information can be obtained regarding the feasibility of any specific decontamination process. The particular arrangement herein disclosed permits the operator of a chemical decontamination test loop to predetermine the magnitude and direction of process fluid flow across particular surfaces of one or more RCP seals. The invention also assures that each of the seal components will experience a process fluid flow across at least one surface, preferably similar to what would be experienced in an in situ decontamination procedure in an RCS.

Figure 1A:
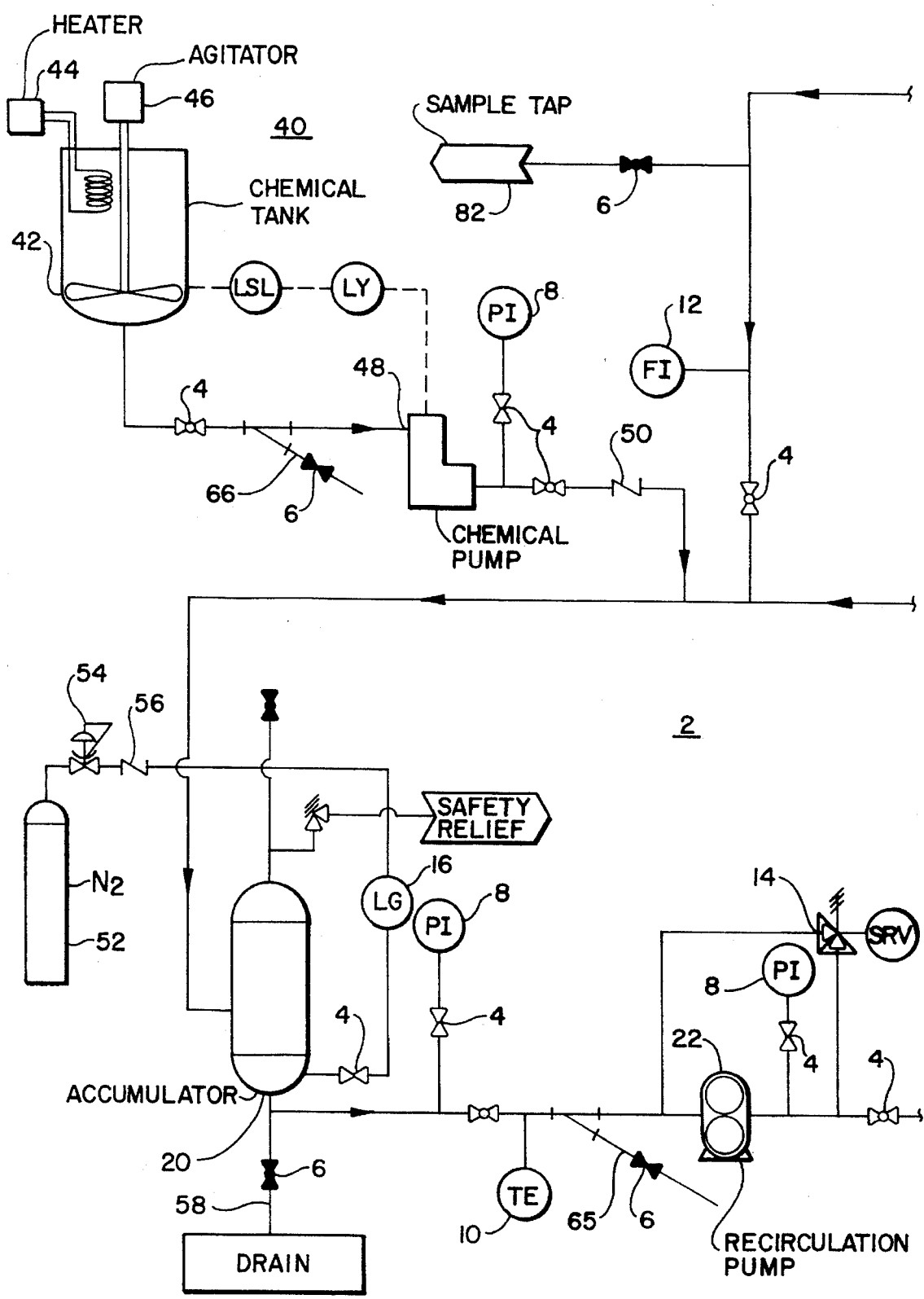
FIG.1a and 1b is a fluid schematic circuit of a chemical decontamination test loop.
Figure 1B:
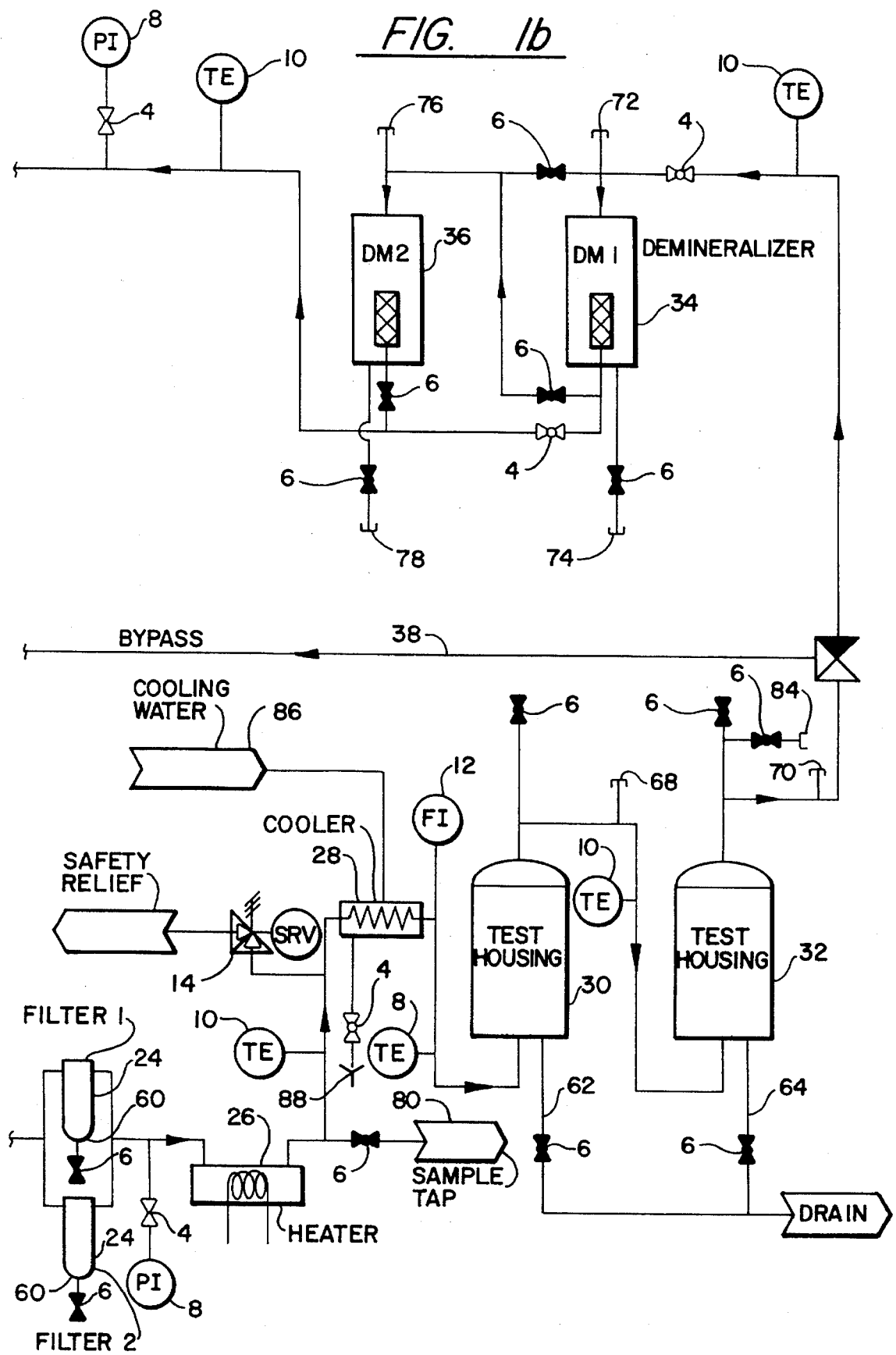

FIG. 1 schematically illustrates a preferred arrangement of a chemical decontamination test loop fluid circuit 2. Normally open valves 4 in the test loop 2 are depicted by open valve icons and normally closed valves 6 are depicted by filled valve icons. Most of the valves are preferably capable of automated control. Arrows indicate the direction of fluid flow. Pressure indicators 8 are each depicted by a "PI" within a circle. Temperature sensors 10 are each depicted by a "TE" within a circle. Similarly, flow indicators 12 are each shown as an "FI" within a circle, "SRV" within a circle is used to indicate each of the safety relief valves 14, and "LG" within a circle indicates a level gauge 16.

A primary portion of the test loop 2 includes, in series connection, a ballast tank, or accumulator 20, a recirculation pump 22, a pair of parallel connected filters 24, a heater 26, and a cooler 28 positioned upstream from first and second test housings 30, 32, also connected in series. Downstream from the second test housing 32 and feeding back into the accumulator 20 are first and second demineralizers 34, 36 that can be valved in series or parallel connection. A demineralizer bypass line 38 permits bypassing the demineralizers 34, 36.

A chemical injection circuit 40 just upstream from the accumulator 20 permits controlled injection of process chemicals. The chemical injection circuit 40 includes a chemical injection tank 42 having a heater 44 and an agitator 46. Chemicals from the chemical injection tank are pumped from the chemical injection tank 42 into the test loop 2 by a chemical pump 48 that can preferably include an internal relief device (not shown). A check valve 50 prevents back flow of process fluids from the primary portion of the test loop 2 back into the chemical pump 48.

A regulated source of pressurized $N_2$ gas, which can be provided by a pressurized gas cylinder 52 regulated by a pressure regulator valve 54 and protected by a check valve 56, permits flushing of the accumulator 20 and other parts of the test loop 2 with clean $N_2$ gas.

Drain lines 58, 60, 62 and 64 are provided, respectively for the accumulator 20, filters 24, first test housing 30 and second test housing 32. In addition, the test loop 2 has a drain 65 and the chemical injection circuit 40 has a drain 66. Differential pressure taps 68 and 70 are located downstream of the first test housing 30 and the second test housing 32 respectively. Similarly, differential pressure taps 72 and 74 permit monitoring of the pressure drop across the first demineralizer 34 and pressure taps 76 and 78 permit monitoring of the pressure drop across the second demineralizer 36. Sample taps 80 and 82 are located between the heater 26 and the cooler 28 and between the demineralizers 34, 36 and the chemical injection circuit 40. A fill line 84 is located on a branch line downstream from the second test housing 32. Cooling water 86 is fed into the cooler 28 and drains though line 88.

Figure 2:
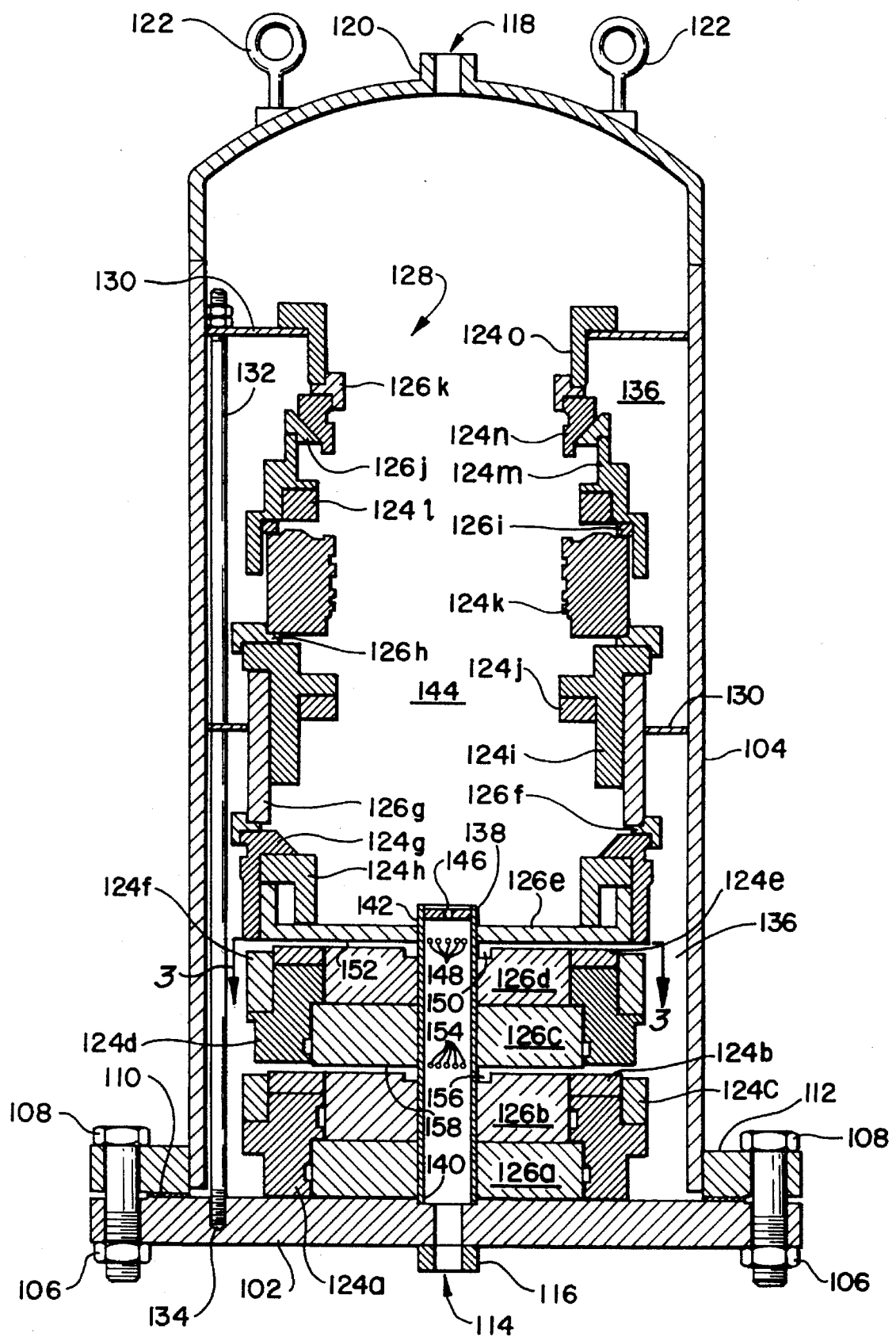
FIG. 2 is a longitudinal cross section view of an apparatus containing a stack of RCP seals for test decontamination in a test loop.

A test housing 100 is shown in partial cross section in FIG. 2. The test housing 100 comprises a bottom flange 102 and a flanged bell 104 removably joined together by a plurality of fasteners, such as nuts 106 and bolts 108. A gasket, such as a flat annular grafoil o-ring 110, provides a water-tight seal between the bottom flange 102 and the flange 112 of the bell 104. An inlet 114 for a flow of process fluids into the housing 100 is provided by a central opening in the bottom flange 102. An outlet 118 is provided in the preferred embodiment illustrated by an opening at the top end of the bell 104. The inlet 114 and the outlet 118 can have fittings 116 and 120 respectively, or some other means well known in the plumbing arts, for connecting to pipes (not shown) in the test loop. A system for hoisting the bell, such as a pair of eye bolts 122 connected to the top end of the bell 104, enables attachment of cables or other lifting means for hoisting and moving the test housing 100. The test housing 100 can also be supported by or attached to a bottom support (not shown) under the bottom flange 102 to locate the test housing 100 in an elevated, stable position. As is commonly the case with apparatus used in the nuclear industry, parts that are subjected to radioactive environments, such as the test housing 100 and the pipes in the test loop, are generally fabricated from stainless steel. The test housing 100 is preferably about 30 inches high by about 18 inches in diameter. The wall thickness of the bell is preferably one inch.

A set of RCP seals 124a–l from, for example, a single RCP can be contained inside the test housing 100. The set illustrated includes a #1 seal runner (base 124a, SiNi plated face plate 124b, and clamp 124c), a #1 seal ring (base 124d, SiNi plated face plate 124e, and clamp 124f), a #1 seal retainer assembly (124g, 124h), a #3 seal ring assembly (124i, 124j), a #2 seal runner (124k), a #2 seal retainer assembly (124l, 124m), a #3 seal runner (124n) and a #1 seal insert (124o). The RCP seals 124a–o are positioned by a set of pre-machined stacking spacers 126a–k. The seals 124a–o together with the stacking spacers 126a–k form a generally annular-shaped, stacked seal assembly 128 extending from the bottom flange 102 to near the top of the bell 104. The seal assembly is arranged such that each of the seal components can be exposed to a flow of process fluid during a test decontamination. The seal assembly 128 is preferably arranged such that the seal surfaces that are exposed to process fluid flow within the test housing 100 are the same surfaces that are exposed to coolant water flow in an operating RCP.

Each of the RCP seals 124a–o is shaped differently, therefore the stacking spacers 126a–k, which are each shaped to fit adjacent one or more surfaces of at least one of the RCP seals 124a–o, are also generally shaped differently from each other. FIG. 2 is simplified in that bolts or pins holding together the various parts of the seal assembly are not illustrated. The detailed arrangement of such bolts or pins will depend upon the design of the pump seals, which may vary depending upon the particular model RCP that the seals are from.

A plurality of longitudinally spaced, annular-shaped support rings 130 stabilize the seal assembly 128 at different points between the bottom flange 102 and the upper end of the seal assembly 128. Three elongated posts 132 (only one shown), each connecting to the bottom flange 102, for example, with a threaded fitting 134, support and position the support rings 130. The support rings 130 each have openings (not shown) so that process fluids can flow longitudinally in the generally annular-shaped first space 136 defined by the outer radial periphery of the seal assembly 128 and an inner surface of the bell 104.

The bottommost stacking spacers, 126a–e, are centered around a vertically positioned fluid flow distribution tube 138 connecting at a first end 140 to the fluid inlet 114. The second end 142 of the distribution tube 138 extends partially into a central cylindrical-shaped second space 144 that is defined by the seal assembly 128 and through which process fluids can flow. The distribution tube 138 is used to selectively distribute the loop fluid flow across at least one of the RCP seal surfaces being decontaminated or tested.

Figure 3:
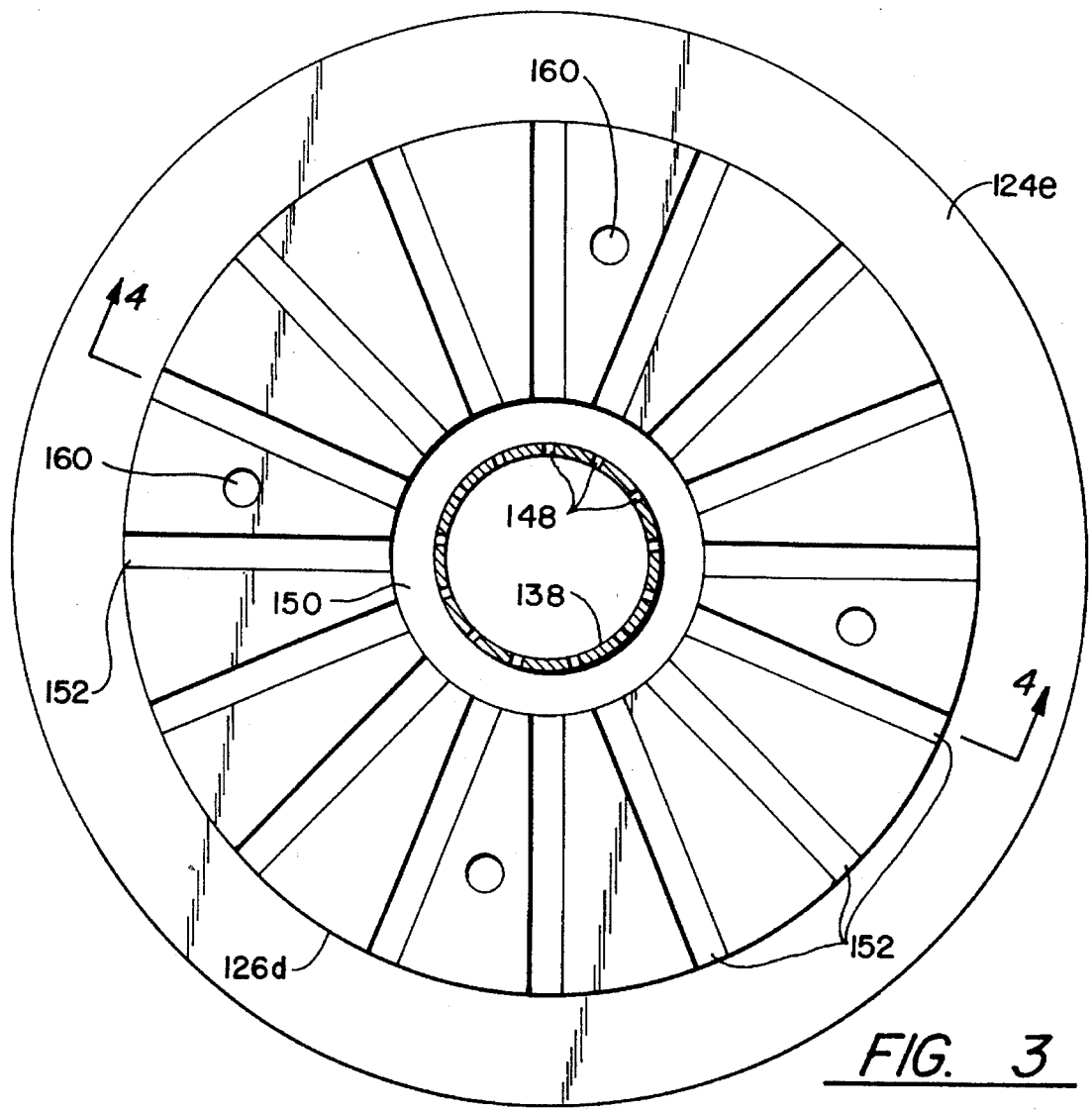
FIG. 3 is a cross sectional view through line 3—3 of FIG. 2.
Figure 4:
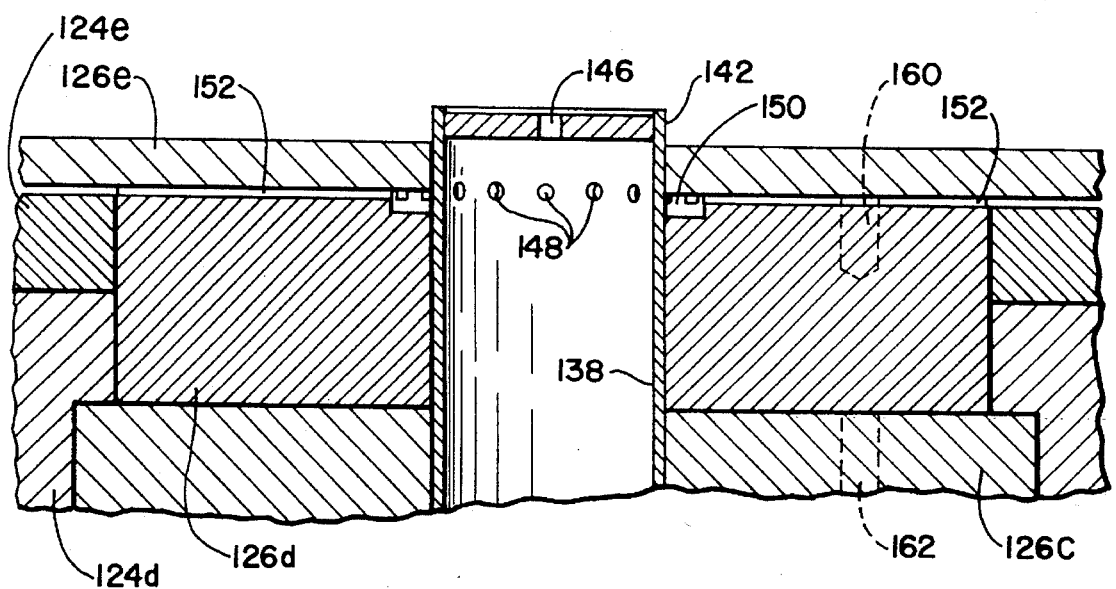
FIG. 4 is a cross sectional view through line 4—4 of FIG. 3.

Fluid entering the test housing 100 through the inlet 114 flows up into the distribution tube 138. Referring now also to FIGS. 3 and 4, the distribution tube 138, in this embodiment of the invention, has a vent hole 146 at the second end 142 to permit some of the process fluids to flow into the second space 144. A first plurality of circumferentially spaced penetrations 148 directs a flow of process fluids radially outward to an about annular-shaped channel defined by an annular-shaped groove in at least one of a pair of confronting surfaces of a pair of abutting stacking spacers 126d and 126e and by the outer peripheral surface of the tube 138, and preferably defined by an annular-shaped groove 150 in the upper surface of stacking spacer 126d, a lower surface of stacking spacer 126e and the outer peripheral surface of the tube 138. The flow is then directed radially outward through a first plurality of radially extending channels that are defined by radial grooves in at least one of the confronting surfaces, and preferably defined by radial grooves 152 extending from the annular groove 150 to the outer periphery of stacking spacer 126d and by the lower surface of stacking spacer 126e. The fluid flow is thereby directed radially outward from the first plurality of radial channels through an annular space defined by an upper surface of face plate 124e and stacking spacer 126e, and thence to the first space 136 via an annular space defined by an upper surface of the clamp 124f and lower surfaces of the stacking spacer 126e and #1 seal retainer assembly piece 124g. Thus, the flow is directed across the upper surface of face plate 124e and the upper surface of the clamp 124f.

The distribution tube can also include a second plurality of circumferentially spaced penetrations 154 that directs a flow of process fluids radially outward to a second annular channel defined by an annular shaped groove in at least one of a pair of confronting surfaces of abutting stacking spacers 126b and 126c and by the outer peripheral surface of distribution tube 138, and preferably defined by an annular-shaped groove 156 in the upper surface of stacking spacer 126b, a lower surface of stacking spacer 126c and the peripheral surface of the tube 138. The flow is then directed radially outward through a second plurality of radial channels that are defined by radial grooves in at least one of the pair of confronting surfaces of abutting stacking spacers 126b and 126c, and preferably defined by radial grooves 158 extending from the second annular groove 156 to the outer periphery of stacking spacer 126b and by the lower surface of stacking spacer 126c. The fluid flow is thence directed radially outward from the second plurality of radial channels through an annular space defined on a lower side by the upper surfaces of face plate 124b and clamp 124c and defined on upper side by the lower surfaces of stacking spacer 126c and base 124d, and therefrom to the annular space 136. Thus, the flow is directed across the upper surfaces of face plate 124e and clamp 124f, and across the lower surface of base 124d and therefrom to the first space 136.

In the embodiment of the invention illustrated, the vent hole 146 is about ¼ inches long and about 1/16 inches nominal diameter. There are 13 penetrations of about 1/16 inch nominal diameter each in the first plurality of penetrations of the distribution tube 138, and 13 penetrations of about 1/16 inch nominal diameter each in the second plurality of penetrations. The first and second annular grooves are each about ⅜ inch wide by about 3/16 inch deep. The radial grooves 152 and 158 are each about ⅜ inches wide by about 1/16 inch deep. There are 16 equally spaced radial grooves in each of the first and second plurality of radial grooves 152 and 158. In this configuration, an about 6 gpm flow rate through the test housing 100 produces about a 3 ft/sec flow velocity across the upper surfaces of seals 124b and 124e. This simulates the seal injection flow rates expected during an actual full system decontamination operation. This flow rate can be increased or decreased to suit during an actual RCP seal decontamination operation.

The flow velocity across the upper surfaces of face plates 124b and 124e depends primarily upon the number of penetrations 148, 154, 146 and the dimensions of the penetrations 148, 154, 146 in the distribution tube 138, the flow rate into the distribution tube, and the spacing between the upper surfaces of face plates 124b and 124e and the surfaces opposing them, and, to a lesser extent, upon the dimensions of grooves 150, 152, 156 and 158. Therefore, the number of and the dimensions of each of the first plurality of penetrations 148 and/or the second plurality of penetrations 154 can be made different from the dimensions in the illustrated embodiment in order to test different magnitudes of flow across, in particular, the upper surfaces of face plates 124b and 124e. Also, the spacing between the surfaces on seals 124b and 124e and opposing seal or stacking spacer surfaces can be selectively increased or decreased to select a desired flow characteristic. These adjustments can be done alone or in conjunction with adjusting the dimensions of the first annular groove 150 and/or second annular groove 156, and/or the dimensions or number of the radially extending grooves 152, 158. More or less flow can be obtained in the central region 144 by adjusting the size of the vent hole 146, or even eliminating it altogether. The flow characteristics through the test housing 100 and over particular selected surfaces can thus be changed by selectively making changes in either or both of the distribution tube and the grooves in the stacking spacers. For a given arrangement, changing the total flow rate through the test housing to a selected magnitude can also be varied to change the flow velocities across each exposed seal surface. The flow characteristics through the test housing 100 and over particular selected surfaces can thus be controlled by selecting different values of these parameters.

In addition, by using different shaped stacking spacers, the order of stacking the RCP seals 124a–o can be adjusted in order to position different ones of the seals 124a–o near the flow emanating from penetrations 148 or 154. It is not necessary, in practicing the invention, to place all the seals from an RCP pump into a test housing 100. The test housing 100 may also contain only some of the seals from an RCP, or may contain seals from more than one RCP.

Tapped holes 160, 162 are for insertion of eye bolts (not shown) that are used for hoisting the stacking spacers 126d and 126e respectively and placing them during assembly and disassembly of the seal assembly 128.

Whereas a particular embodiment of the present invention has been described as an example, it will be appreciated that variations of the details may be made without departing from the invention. Therefore, reference should be made to the appended claims rather than the foregoing discussion of a preferred example, in order to assess the scope of the invention in which exclusive rights are claimed.

I claim:

1. A reactor coolant pump test decontamination system, comprising:

a sealed test housing including a fluid inlet and a fluid outlet spaced apart in a longitudinal direction for flowing a process fluid through the test housing;

a seal assembly comprising a plurality of reactor coolant pump seals and a plurality of stacking spacers, each of the stacking spacers and the seals having a generally annular-shaped cross section, the seal assembly being arranged in a generally annular-shaped, longitudinally extending stack within the test housing;

a generally annular-shaped first space within the test housing defined by the test housing and an outer radial periphery of the seal assembly;

a generally cylindrical-shaped second space within the test housing defined by the interior radial periphery of the seal assembly; and flow distribution means for directing a flow of the process fluid across a surface of a selected one of the pump seals.

2. The system of claim 1, wherein the flow distribution means includes a fluid distribution tube extending longitudinally within the test housing and centered coaxially in the seal assembly, including a first end connecting with the fluid inlet and at least one penetration in the flow distribution tube at a selected first longitudinal position spaced from the first end for providing for the flow of the process fluid therefrom.

3. The system of claim 1, wherein the flow distribution means includes first channel means for receiving the flow of the process downstream from the at least one penetration and for channelling the flow about radially outward across the surface of the selected one of the pump seals, the first channel means comprising a first plurality of about radially extending channels in the seal assembly at about the first longitudinal position.

4. The system of claim 3, wherein the at least one penetration in the flow distribution tube comprises a first plurality of circumferentially spaced penetrations, and wherein the first channel means comprises a first annular-shaped channel at about the first longitudinal position connecting between the plurality of circumferentially spaced penetrations and the first plurality of about radially extending channels.

5. The system of claim 4, wherein the first annular-shaped channel is defined by an annular-shaped groove in at least one of a pair of confronting surfaces of an abutting pair of the stacking spacers and by a peripheral wall of the flow distribution tube, and wherein each of the first plurality of about radially extending channels is defined by a radial groove in at least one of the pair of confronting surfaces of the abutting pair of the stacking spacers.

6. The system of claim 4, wherein the first annular-shaped channel is defined by an annular-shaped groove in a surface of a first one of the stacking spacers, a first facing surface of a second one of the stacking spacers abutting the surface of the first one of the stacking spacers and by a peripheral wall of the flow distribution tube, and wherein each of the first plurality of radially extending channels is defined by the first facing surface and a radial groove in the surface of the first one of the stacking spacers extending radially from the first annular groove to a radial periphery of the first one of the stacking spacers.

7. The system of claim 4, wherein the distribution tube includes a vent hole in a second end of the tube for outflow of the process fluid to the second space.

8. The system of claim 7, wherein the seal assembly is characterized in that the surface of the selected one of the pump seals is spaced apart from an opposing surface of one of a different one of the plurality of stacking spacers and another one of the pump seals, wherein the process fluid can flow radially outward therebetween from the first plurality of radially extending channels to the first space.

9. The system of claim 8, wherein the test housing comprises a bell that includes the outlet and a flanged end opposite the outlet, a bottom flange that includes the inlet, flange seal means for providing a seal between the bottom flange and the flanged end and means for urging the bottom flange towards the flanged end with the flange seal means therebetween, and wherein the seal assembly includes a positioning ring in the first space radially positioning the stack and supported at a fixed longitudinal position by a plurality of longitudinally extending posts each connected at a first end to the bottom flange.

10. The system of claim 7, wherein the flow distribution means is characterized in that the dimensions of the vent hole and each of the first plurality of circumferentially spaced penetrations are selected such that a greater proportion of the process fluid can flow through the first space than through the second space.

11. The system of claim 8, wherein the flow distribution means includes second flow means for directing a second flow of the process fluid across a surface of a second selected one of the pump seals at about a second longitudinal position spaced from the first end and spaced from the first longitudinal position.

12. The system of claim 11, wherein the second flow means comprises:
- a second plurality of circumferentially spaced penetrations in the fluid distribution tube at about the second longitudinal position;
- a second plurality of about radially extending channels in the seal assembly at about the second longitudinal position; and
- a second annular-shaped channel at about the second longitudinal position connecting between the second plurality of circumferentially spaced penetrations and the second plurality of about radially extending channels.

13. The system of claim 12, wherein the second annular-shaped channel is defined by a annular-shaped groove in at least one of a pair of confronting surfaces of a second abutting pair of the stacking spacers and by a peripheral wall of the flow distribution tube, whereby the second plurality of circumferentially spaced penetrations direct the second flow into the second annular-shaped channel, and wherein each of the second plurality of about radially extending channels is defined by a radial groove in at least one of the pair of confronting surfaces of the second abutting pair of the stacking spacers, whereby the second annular-shaped channel directs the second flow into the second plurality of radially extending channels and the second plurality of radially extending channels directs the second flow across the surface of the second selected one of the pump seals.

14. The system of claim 12, wherein the seal assembly is characterized in that the surface of the second selected one of the pump seals is spaced apart from an opposing surface of a different one of the plurality of stacking spacers or a different one of the pump seals, wherein the process fluid can flow therebetween from the second plurality of radially extending channels to the first space.

15. The system of claim 12, wherein the flow distribution means is characterized in that the dimensions of each of the first plurality of circumferentially spaced penetrations and each of the second plurality of circumferentially spaced penetrations are selected such that the first flow and the second flow each have a fluid velocity of about 3 ft/s across each of the surface of the selected one of the pump seals and the surface of the second selected one of the pump seals when the flow rate through the test housing is about 6 gpm.

16. A reactor coolant pump test decontamination system, comprising:
- a sealed test housing including a fluid inlet and a fluid outlet spaced apart in a longitudinal direction for flowing a process fluid through the test housing;
- a seal assembly comprising a plurality of reactor coolant pump seals and a plurality of stacking spacers, each of the stacking spacers and the seals having a generally annular-shaped cross section, the seal assembly being arranged in a generally annular-shaped, longitudinally extending stack within the test housing;
- a generally annular-shaped first space within the test housing defined by the test housing and an outer radial periphery of the seal assembly;
- a generally cylindrical-shaped second space within the test housing defined by the interior radial periphery of the seal assembly; and
- flow distribution means for directing a flow of the process fluid across a surface of each of the pump seals.

17. A reactor coolant pump test decontamination loop comprising:
- a sealed test housing including:
  - a flange comprising a fluid inlet centrally located at a first end;
  - a flanged bell comprising a flanged end mating with the flange and a fluid outlet at a second end longitudinally spaced apart from the flanged end;
  - a fluid distribution tube connecting at a first end to the fluid inlet and extending longitudinally within the test housing;
- a seal assembly comprising a plurality of reactor coolant pump seals and a plurality of stacking spacers, each of the stacking spacers and the seals having a generally annular-shaped cross section, the seal assembly being arranged in a generally annular-shaped stack centered on the fluid distribution tube within the test housing;
- a generally annular-shaped first space within the test housing defined by the test housing and an outer radial periphery of the seal assembly;
- a generally cylindrical-shaped second space within the test housing defined by the interior radial periphery of the seal assembly;
- positioning means for positioning and stabilizing the seal assembly within the test housing; and
- flow distribution means for directing a flow of the process fluid across a radially extending surface of a selected one of the pump seals located at a first longitudinal position spaced apart from the bottom flange, including:
  - a plurality of circumferentially spaced penetrations in the flow distribution tube at about the first longitudinal position providing for an outflow of the process fluid therefrom;
  - an annular-shaped channel communicating with the plurality of circumferentially spaced penetrations;
  - a plurality of about radially extending channels at about the first longitudinal position each communicating with the annular-shaped channel; and
  - a vent hole in a second end of the flow distribution tube for outflow of the process fluid to the second space; and
- the seal assembly being characterized in that the radially extending surface is spaced apart from an opposing surface of one of the plurality of stacking spacers and another one of the pump seals, wherein the process fluid can flow therebetween from the first plurality of radially extending channels to the first space.

18. The system of claim 17, wherein the flow distribution means is characterized in that the dimensions of the vent hole and each of the plurality of circumferentially spaced penetrations are selected such that a greater proportion of the process fluid can flow through the first space than through the second space.

19. A method of test decontaminating a plurality of reactor coolant pump seals with a reactor coolant pump test and decontamination loop comprising means for flowing a process fluid therethrough, comprising the steps of:
- enclosing an annular-shaped stack, including the plurality of reactor coolant pump seals and a plurality of stacking spacers, in a test housing having a fluid inlet and a fluid outlet;
- connecting the inlet and the outlet of the test housing to the fluid flow loop such that the process fluid can flow through the test housing;
- flowing the process fluid through the fluid flow loop, including the test housing; and
- selectively directing a flow of the process fluid in the test housing across a surface of a selected one of the pump seals.

20. The method of claim 19, wherein the step of selectively directing a flow includes the steps of:

first directing the flow from the inlet into a fluid distribution tube connected at one end to the inlet and extending longitudinally in the test housing, the stack being centered on the distribution tube;

second directing the flow therefrom through at least one penetration in the distribution tube at a selected longitudinal position;

third directing the flow therefrom through a plurality of radially extending channels in the stack at the selected longitudinal position;

fourth directing the flow therefrom across the surface of the selected one of the pump seals;

fifth directing the flow therefrom into the first space; and sixth directing the flow therefrom out the outlet.

21. The method of claim 20, wherein the step of selectively directing a flow includes, between the step of second directing the flow and the step of third directing the flow, directing the flow through an annular-shaped channel at about the selected longitudinal position in fluid connection between the at least one penetration and the plurality of radially extending channels.

22. The method of claim 20, wherein the step of selectively directing a flow includes the step of controlling a fluid flow velocity across the surface of the selected one of the pump seals.

23. The method of claim 22, wherein the step of controlling the fluid flow velocity includes the steps of selecting a size of each of the at least one penetration in the distribution tube, selecting a number of distribution tube penetrations, and by selecting a fluid flow rate through the test housing.

24. The method of claim 23, wherein the step of controlling the fluid flow velocity includes the steps of selecting a spacing between the surface of the selected one of the pump seals and a facing surface of one of an adjacently located stacking spacer and an adjacently located one of the pump seals.

* * * * *